(12) United States Patent
Borne

(10) Patent No.: US 6,868,589 B2
(45) Date of Patent: Mar. 22, 2005

(54) ELECTRICAL CORD ANCHORING APPARATUS

(76) Inventor: Lynn Eric Borne, 1008 N. Kenilworth, Unit A, Glendale, CA (US) 91202

(*) Notice: Subject to any disclaimer, the term of this patent is extended or adjusted under 35 U.S.C. 154(b) by 24 days.

(21) Appl. No.: 10/644,198

(22) Filed: Aug. 19, 2003

(65) Prior Publication Data

US 2005/0039310 A1 Feb. 24, 2005

(51) Int. Cl.[7] ............................................. A44B 21/00
(52) U.S. Cl. ......................................... 24/300; 24/298
(58) Field of Search ........................... 24/16 PB, 16 R, 24/17 AP, 17 R, 300–302, 71.1, 30.5 R, 298, 30.5 L, 18, 129 C, 129 R, 131 R; 119/769, 793, 795, 797, 798; 294/154; 81/16; 410/96, 100; 408/241 R; 279/149; 439/369, 371

(56) References Cited

U.S. PATENT DOCUMENTS

| | | | |
|---|---|---|---|
| 170,573 A | | 11/1875 | Lesh |
| 332,178 A | * | 12/1885 | Atwood ........................ 2/341 |
| 904,843 A | * | 11/1908 | Cooper ..................... 24/129 R |
| 1,396,270 A | * | 11/1921 | Greierson ................... 224/150 |
| 1,490,066 A | * | 4/1924 | Carr ........................... 224/577 |
| 3,328,064 A | * | 6/1967 | Simon ......................... 24/298 |
| 4,432,121 A | * | 2/1984 | Dupre .......................... 24/343 |
| 4,569,108 A | | 2/1986 | Schwab ......................... 24/17 |
| 4,885,824 A | | 12/1989 | Schwab et al. ................. 24/17 |
| 4,890,410 A | * | 1/1990 | Pratscher et al. ............... 43/15 |
| 5,396,684 A | | 3/1995 | Yocom .......................... 24/16 |
| 5,456,213 A | * | 10/1995 | Beauchamp .................. 119/793 |
| 5,462,019 A | * | 10/1995 | Hong-Rong et al. .......... 119/795 |
| D381,893 S | | 8/1997 | Klamm ......................... D8/394 |
| 5,695,101 A | * | 12/1997 | Frietze ....................... 224/250 |
| 5,797,167 A | | 8/1998 | Schwab ......................... 24/16 |
| 5,802,676 A | | 9/1998 | Tolan ........................... 24/16 |
| 6,038,745 A | * | 3/2000 | Rapp .......................... 24/68 R |
| 6,041,960 A | | 3/2000 | Leal ........................... 220/315 |
| 6,279,205 B1 | * | 8/2001 | Steiner ........................ 24/130 |
| 6,317,938 B1 | | 11/2001 | Durette ........................ 24/298 |
| 6,389,655 B2 | * | 5/2002 | Libecco ........................ 24/300 |
| 2001/0001340 A1 | | 5/2001 | Libecco ........................ 24/300 |
| 2002/0138952 A1 | | 10/2002 | Chou .......................... 24/300 |
| 2002/0170149 A1 | | 11/2002 | Severson ....................... 24/16 |

FOREIGN PATENT DOCUMENTS

GB 2 238 342 A * 2/1991

* cited by examiner

Primary Examiner—Robert J. Sandy
Assistant Examiner—Ruth C. Rodriguez
(74) Attorney, Agent, or Firm—Gene Scott Patent Law & Venture Group

(57) ABSTRACT

A cord securement apparatus comprises an elongate elastic band having a hook integral with one end of the band, and an eyelet integral with the other end of the band. The eyelet is slidingly engaged medially with the band thereby forming a loop at the other end of the band. The loop may be tightened about an electrical cord and the band may be wound about the electrical cord and its appliance in order to secure the electrical cord in place.

8 Claims, 1 Drawing Sheet

ELECTRICAL CORD ANCHORING APPARATUS

BACKGROUND OF THE INVENTION

1. Incorporation by Reference

Applicant hereby incorporates herein by reference, any and all U.S. patents, U.S. patent applications, and other documents and printed matter cited or referred to in this application.

2. Field of the Invention

This invention relates generally to cord, cable, rope and similar items and more particularly to an apparatus for anchoring and for organizing such items.

3. Description of Related Art

The following art defines the present state of this field:

Klamm, U.S. Des. 381,893 teaches a design with hooks at both ends and a loop at one end, but as a design patent it is not disclosed that the loop may be tightened or if it is a fixed constant diameter loop. Schwab et al '893 teaches an elastic with hook at one end and the remaining cord formed as a loop, which may be adjusted as to size. No eyelet is taught.

Yocom, U.S. Pat. No. 5,396,684 teaches an elastic with eyelets or hooks at both ends of an elastic or one of each at opposing ends. Schwab teaches the use of rings for forming loop in elastic members.

Tolan, U.S. Pat. No. 5,802,676 teaches a Velcro® type strap with a loop at one end. Leal teaches a hold-down strap with a hook at one end and a loop at the opposing end.

Durette, U.S. Pat. No. 6,317,938 teaches an elastic cord with loop and hook at one end.

Libecco, U.S. 2001/0001340 teaches an elastic cord with hooks at both ends and loop at one end, the loop depending on a rigid straight fixture with dual through holes for capturing the ends of the loop. Chou teaches a strap with hooks at opposing ends and a medial means for tightening the strap. Severson teaches a long strap with plural holes, one end of which may be looped.

Lesh, U.S. Pat. No. 170,573 and Schwab 4,569,108 each teaches an elastic band with hook at one end and loop at the other.

Leal, U.S. Pat. No. 6,041,960 describes an assembly for keeping a garbage can cover in close proximity to the garbage can. The device includes an elongate elastic cord having first and second ends. An eye-bolt is slidably disposed along the cord between the ends. The first end of the cord includes a permanent engagement structure, such as a loop. A hook or other releasable engagement is securely mounted to the second end of the cord. The device is used by securing the permanent engagement at the first end of the elastic cord to a first handle of the garbage can. The eye-bolt then is secured to the cover, and the hook at the second end of the cord is used to releasably engage the second handle. The contents of the garbage can can be accessed by removing the hook or other such releasable engagement from the second handle. The cover may then be dropped, but will remain in close proximity to the garbage can due to the attachment of the first end of the elastic cord to the can and the attachment of the eye-bolt to the cover.

Schwab et al., U.S. Pat. No. 4,885,824 describes an adjustable tension fastener which consists of a rigid loop-hook having a rigid loop member and a rigid hook member and a flexible cord connected to the rigid loop member by a pull-through knot for defining a tension portion and a reserve portion of the cord. A binder is used for selectively adjusting the length and tension of the tension portion and securing the rigid loop-hook to a portion of the flexible cord.

Schwab, U.S. Pat. No. 5,797,167 describes an elastic cord tie-down of the bungee or shock cord type and in which means are provided by which to manually adjust the article-engaging loop of the tie-down to articles of diverse geometries and dimensions.

Chou, U.S. 2002/0138952 describes a fastening rope having a buckle, two rope members and two hooking members. The rope members are each connected to the buckle from one end and the respective hooking member from other end. The rope members are elastic so they can stretch to fasten objects with the hooking members fixed in position. The fastening rope won't become loose when used to fasten cargos in a truck when the dimensions of the cargos become smaller due to shaking of the truck, change of position of the cargos or collision between the cargos.

Severson, U.S. 2002/0170149 describes a cord keeper strap having an elongated flexible strap with resilient elastic properties and a plurality of holes along its longitudinal axis. Through employment of a selected hole a cincture can be made about a cord. Other selected holes may be employed by a button fastener and to secure bundled or coiled articles for storage.

Our prior art search with abstracts described above teaches a shock cord, a bed-clothes holder, a closed loop-hook and elastic band fastener, an adjustable tension fastener, an electrical utensil cord-anchoring device, an elastic cord tie-down construction, a strap for securing a bundled cord and the like, a connection assembly for preventing the loss of a garbage can cover, a safety accessory for an elastic with hook combination fastener, an adjustable elastic tie-down cord, a fastening rope, and a cord keeper strap. The prior art, however, does not teach an elastic cord with a hook on one end thereof and a sliding loop a the opposing end, the loop providing an eye for receiving the hook. The present invention fulfills these needs and provides further related advantages as described in the following summary.

SUMMARY OF THE INVENTION

The present invention teaches certain benefits in construction and use which give rise to the objectives described below.

The present invention is a cord securement apparatus comprising an elongate elastic band having a hook integral with one end of the band, and an eyelet integral with the other end of the band. The eyelet is slidingly engaged medially with the band thereby forming a loop at the other end of the band. The loop may be tightened about an electrical cord and the band may be wound about the electrical cord and its appliance in order to secure the electrical cord in place.

A primary objective of the present invention is to provide an apparatus and method of use of such apparatus that provides advantages not taught by the prior art.

Another objective is to provide such an invention capable of easily securing an electrical cord or other flexible device such as a rope or line in a desired configuration.

A further objective is to provide such an invention capable of low cost manufacture.

A still further objective is to provide such an invention capable of securing an electrical cord of an appliance.

A still further objective is to provide such an invention capable of being fixed to an electrical cord at a selected position semi-permanently so that the invention remains ready for use whenever the cord or its appliance is ready to be stored.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above described drawing figures illustrate the invention in at least one of its preferred embodiments, which is further defined in detail in the following description.

Figure 1:
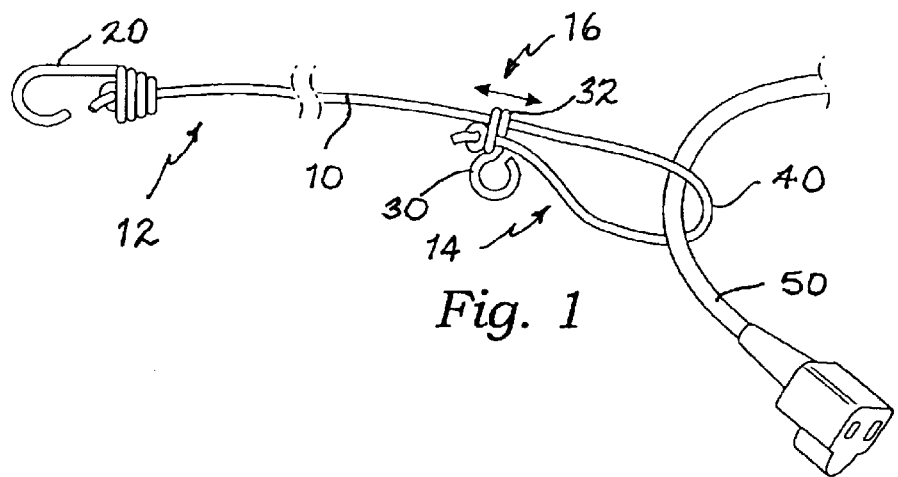
FIG. 1 is a perspective view of the preferred embodiment of the invention.
Figure 2:
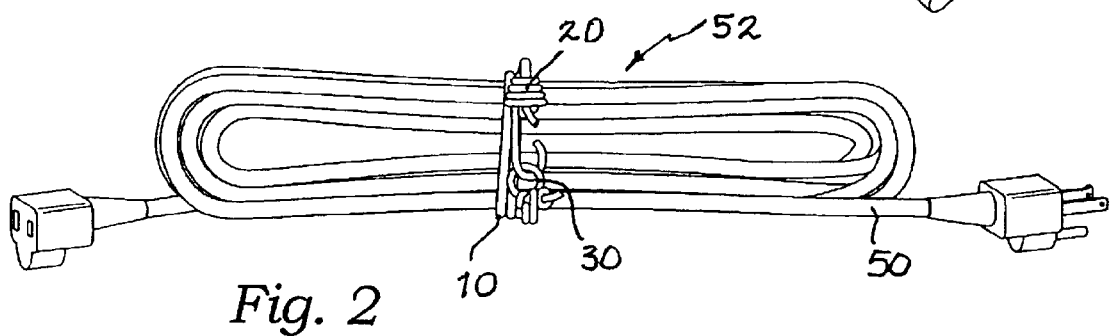
FIG. 2 is an elevational view thereof as used for securing a long electrical cord.
Figure 3:
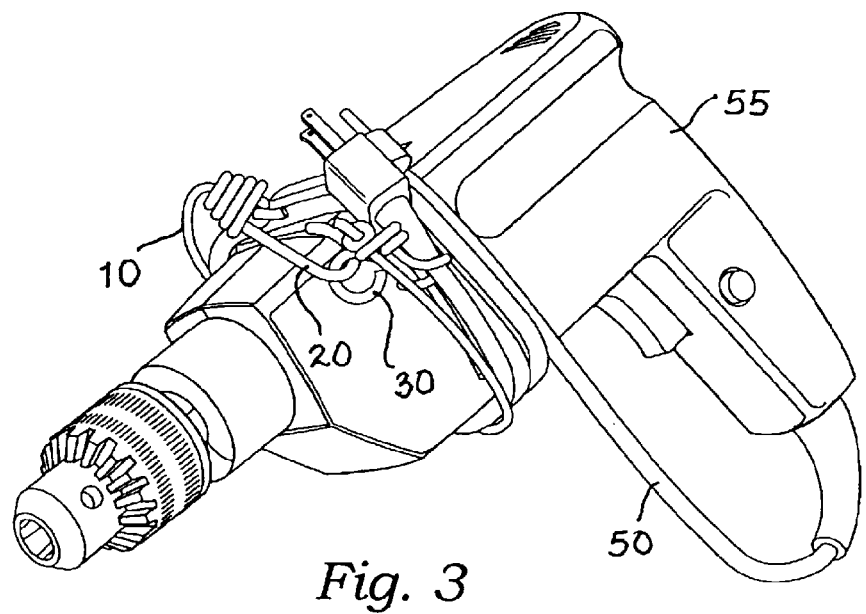
FIG. 3 is a perspective view thereof as used for securing an electrical appliance cord.

The present invention is a cord securement apparatus, that is a hardware item used for organizing and engaging an electrical cord, line, rope or other similar items as will be described below for an electrical cord, but it should be realized that applications to ropes, lines, cables, etc. are equally included in the apparatus and methods of use in the present invention. The invention comprises an elongate band 10 with a hook 20 integral with one end 12 of the band 10, and an eyelet 30 integral with an other end 14 of the band 10. The band 10 is preferably of an elastic nature, as is well known in the art, being able to be extended by applying a pulling force on the band 10, however, the band 10 also may function well in many applications without being of an elastic type and one should understand that the invention does not depend upon the elasticity of the band 10. The hook 20 may be of any type including a hook that has a hinged closure portion as is well known in the art. The eyelet 30 also may be of any type, but must be able to receive the hook 20 in engagement therewith. The illustrations of the invention, shown in FIG. 1–3, show that the hook 20 is attached at the non-looped end of the band 10 while the eyelet 30 is positioned medially on the band 10. It should, however, be realized that instead of eyelet 30, a second hook 20 will substitute quite well for eyelet 30 in most applications, as long as such hooks 20 can be mutually engaged, although an eyelet 30 is preferable. Likewise, in FIG. 1, hook 20 and eyelet 30 may, in most applications, exchange positions without loss of function. These alternate embodiments should be understood to be included in the present invention as trivial alternative configurations. Further, rather than a hook or an eyelet, it should be realized that any simple interconnection device that may play the role of the shown hook 20 and eyelet 30 will suffice to offer the identical enablement as that shown in the figures and should therefore be considered to be a fully functional equivalent.

Further eyelet 30 is slidingly engaged medially on band 10 (eyelet 30 provides coil 32 through which band 10 may slide) thereby forming a loop 40 adjacent the other end 14 of the band, or band 40 may be considered to fully comprise the other end 14, as is clearly shown in FIG. 1. It should be realized that coil 32 is frictionally engaged with band 10 in such a tight fit that although eyelet 30 is able to move along band 10, it moves only through the application of force. Thus, eyelet 30 is able to be positioned at a desired position on band 10 and expected to maintain such position until manually repositioned. This is considered to be a critical aspect of the success of the present invention in meeting its objectives as described above.

The invention may also comprise an electrical cord 50, the loop 40 of the elastic band 10 tightly closed on the electrical cord 50 thereby engaging the elastic band 10 with the electrical cord 50. Coil 32 is able, as shown by the arrow in FIG. 1, to slide along band 10 so as to tighten the loop 40 about the cord 50.

The elastic band 10 may be stretchingly coiled about a gathering 52 of the electrical cord 50, as shown in FIG. 2, and held in place with the hook 20 engaged with the eyelet 30. In this case, the cord 50 is held in a neat configuration for compact storage and to prevent tangling. When the electrical cord 50 is that of an electrical appliance 55 such as the drill shown in FIG. 3, the present invention may be quite useful. With the electrical cord 50 gathered about the appliance 55, and with the band 10 attached to the electrical cord 50 as described above, the band 10 is coiled about the appliance 55 and the electrical cord 50. The hook 20 is then engaged with the eyelet 30 to secure the electrical cord 50 and the band 10 about the appliance 55. This is well shown in FIG. 3.

The method of using the above described invention shall now be described. The hook 20 is fixedly secured at one end 12 of the band 10. This may be accomplished by forming; a base of the hook 20 into a coil and knotting the band 10, as shown in FIG. 1, where the knot is then held within the coil and is unable to slip through its small end. This method is very well known and is in common practice, but the band 10 may alternately be attached to the hook 20 by any method or technique that will form an integral connection between these two parts. The eyelet 20 is attached in a similar manner to the other end 14 of band 10. One portion of eyelet 20 is formed into the coil 32 and is engaged with band 10 medially thereby forming the loop 40 in the elastic band 10 between the eyelet 30 and the medial position 16 of the elastic band 10.

Tightly closing the loop 40 of the elastic band 10 on electrical cord 50 engages the elastic band 10 with the electrical cord 50 as has been described. Gathering the electrical cord 50 as shown in FIG. 2 enables the band 10 to be stretchingly coiling about the electrical cord 50, as gathered, and then engaging the hook 20 with the eyelet 30 secures the electrical cord 50.

Gathering (coiling) the electrical cord 50 about its appliance 55 and then coiling the elastic band 10 about the gathered electrical cord 50 and also the electrical appliance 55 enables securement of the cord 50 by engaging the hook 20 with the eyelet 30.

While the invention has been described with reference to at least one preferred embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A cord securement apparatus comprising: an elongate band; a hook integral with one end of the band, an eyelet integral with an other end of the band, a coil of the eyelet frictionally slidingly engaged medially with the band thereby forming a loop adjacent the other end of the band, through friction between the eyelet coil and the band, the loop enabled for fixed size adjustment by moving the eyelet coil to a selected position on the band.

2. The apparatus of claim 1 further comprising an electrical cord, the loop of the band tightly closed on the electrical cord thereby engaging the band with the electrical cord.

3. The apparatus of claim 2, wherein the band is stretchingly coiled about a gathering of the electrical cord and held in place with the hook engaged with the eyelet.

4. The apparatus of claim 2 further comprising an electrical appliance serviced by the electrical cord, the electrical cord gathered about the appliance, the band coiled about the appliance and the electrical cord, the hook engaged with the eyelet in securement of the electrical cord and the band about the appliance.

5. A cord securement method comprising the steps of: fixedly engaging a hook at one end of a band; fixedly engaging an eyelet at an opposing end of the band; frictionally slidingly engaging a coil of the eyelet at a medial position of the band; forming a loop in the band between the eyelet and the medial position of the band.

6. The method of claim 5 further comprising the step of: tightly closing the loop of the band on an electrical cord, thereby frictionally engaging the band with the electrical cord.

7. The method of claim 6, further comprising the steps of: gathering the electrical cord; stretchingly coiling the band about the gathering of the electrical cord, and engaging the hook with the eyelet to secure the electrical cord.

8. The method of claim 6 further comprising the steps of: gathering the electrical cord; coiling the band about the gathered electrical cord and the electrical appliance serviced by the electrical cord; engaging the hook with the eyelet in securement of the electrical cord and the band about the appliance.

\* \* \* \* \*